(12) United States Patent
Yuki et al.

(10) Patent No.: US 6,903,507 B2
(45) Date of Patent: Jun. 7, 2005

(54) PLASMA DISPLAY PANEL AND ITS MANUFACTURING METHOD

(75) Inventors: Haruhiro Yuki, Shijonawate (JP); Yoshiyasu Honma, Katano (JP); Yoshio Maruyama, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 113 days.

(21) Appl. No.: 10/603,607

(22) Filed: Jun. 26, 2003

(65) Prior Publication Data

US 2004/0061442 A1 Apr. 1, 2004

(30) Foreign Application Priority Data

Jun. 27, 2002 (JP) .................................... 2002-187763

(51) Int. Cl.[7] ................................................ H01J 17/49
(52) U.S. Cl. ................................... 313/582; 313/586
(58) Field of Search ............................ 313/485, 486, 313/582, 586, 292

(56) References Cited

FOREIGN PATENT DOCUMENTS

| JP | 2000-77002 | 3/2000 |
|---|---|---|
| JP | 2001-273854 | 10/2001 |
| JP | 2002-8544 | 1/2002 |

*Primary Examiner*—Vip Patel
(74) *Attorney, Agent, or Firm*—Wenderoth, Lind & Ponack, L.L.P.

(57) ABSTRACT

A high-definition plasma display panel and its manufacturing method. Luminance is increased by increasing surface area of a phosphor layer without reducing a discharge space of a discharge cell. For formation of the phosphor layer, an organic binder is made by dissolving, through heating, at least an organic solvent and a plurality of resins of different solubilities with respect to the organic solvent, and phosphor paste is made of this organic binder and phosphor particles. A recessed and projected part is formed of spaces formed by burning out gelled substances formed by the resin with low solubility in a phosphor film, thereby increasing the surface area of the phosphor layer. Consequently, increased luminance is obtained.

3 Claims, 8 Drawing Sheets

FIG. 1 step 1 — Make organic binder step 2 — Make phosphor paste step 3 — Apply phosphor paste step 4 — Dry step 5 — Fire Phosphor layer is finished

PLASMA DISPLAY PANEL AND ITS MANUFACTURING METHOD

FIELD OF THE INVENTION

The present invention relates to a surface discharge AC type plasma display panel used as a thin display device affording excellent visibility in a television receiver or the like and also relates to its manufacturing method.

BACKGROUND OF THE INVENTION

A plasma display panel is classified as an AC or DC type according to its driving form and classified as a surface discharge type or an opposing discharge type according to its discharge form. In terms of high definition, large screen size, facilitation of production and others, the surface discharge AC type plasma display panel has become mainstream under present conditions.

The plasma display panel has a surface panel and a back panel that are made by forming electrodes and various projections serving as barrier ribs and others on glass substrates. With the surface and back panels opposed to each other, their periphery is sealed, and their interior is filled with inert gas or discharge gas.

Figure 6:
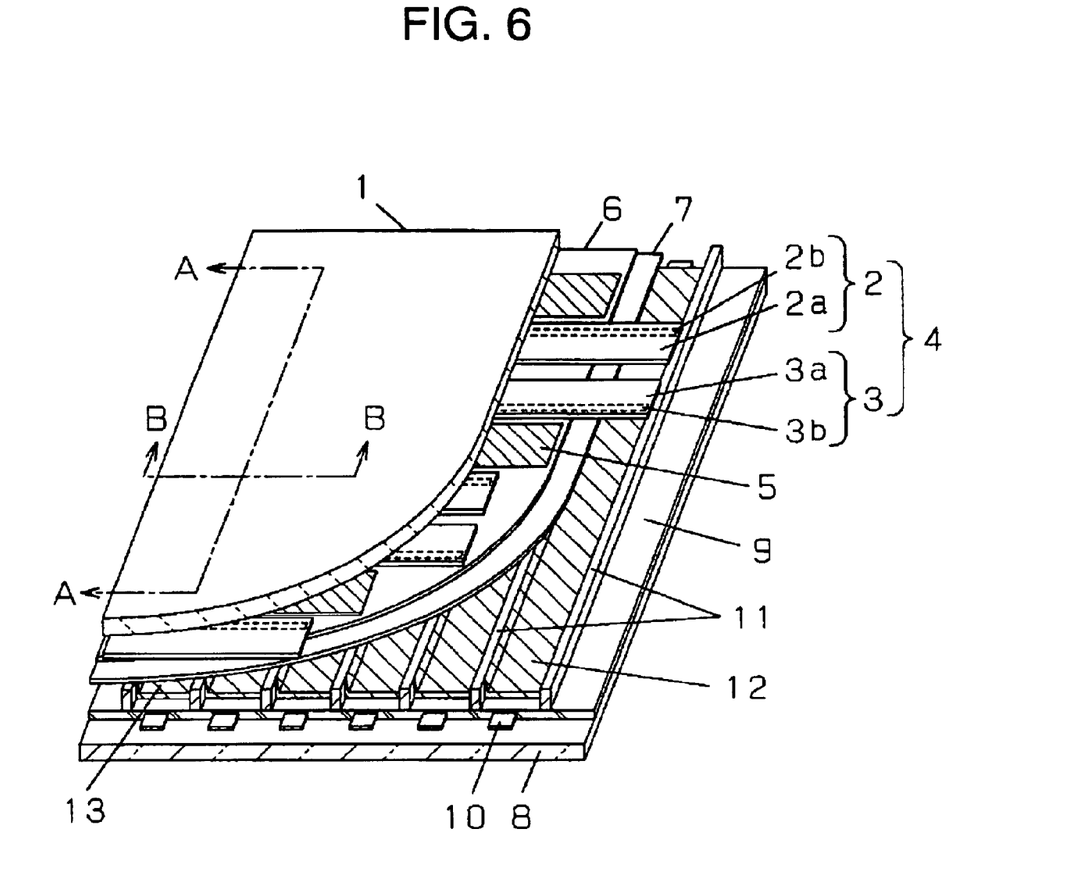
FIG. 6 is a perspective view of a surface discharge AC type plasma display panel.
Figure 7:
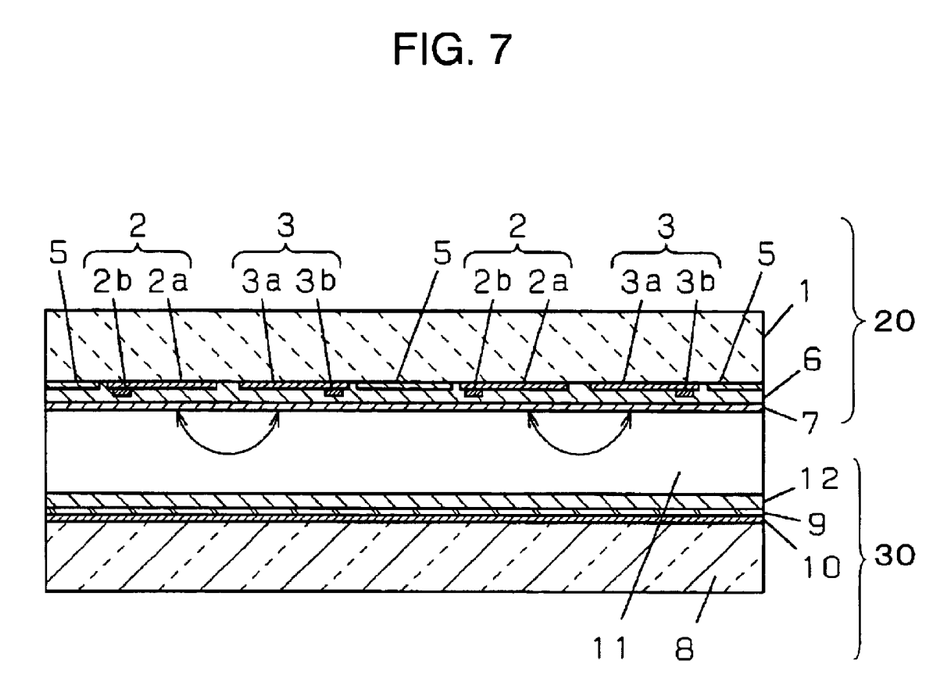
FIG. 7 is a sectional view taken along line A—A of FIG. 6.
Figure 8:
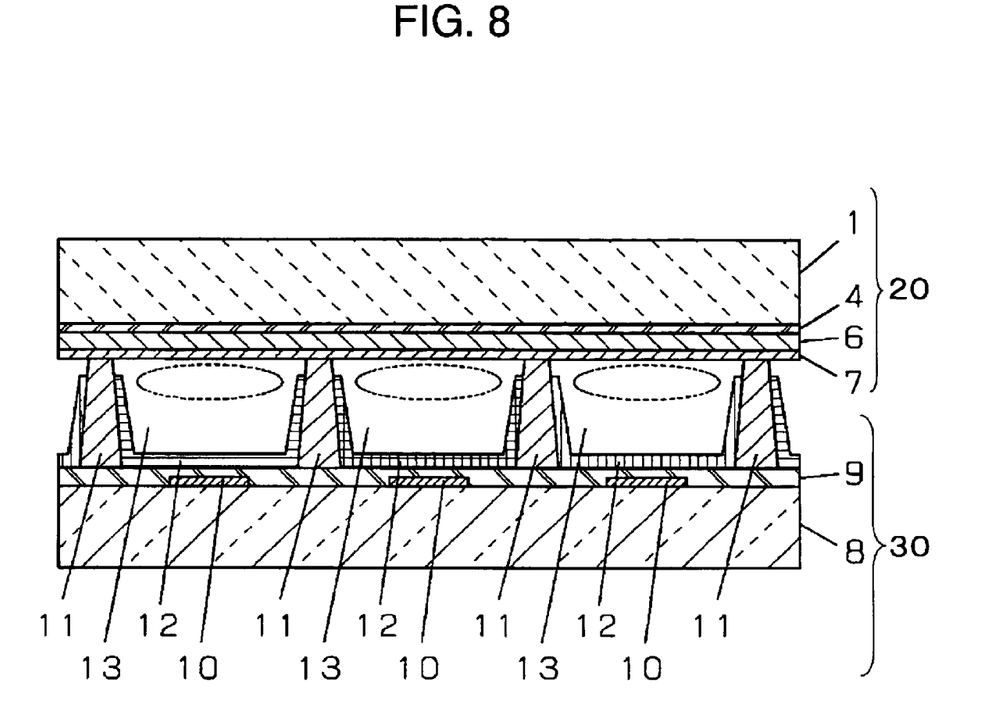
FIG. 8 is a sectional view taken along line B—B of FIG. 6.

Referring to FIGS. 6–8, a description will be provided hereinafter of the structure of the typical surface discharge AC type plasma display panel. FIG. 6 is a perspective view of the surface discharge AC type plasma display panel. FIG. 7 is a sectional view taken along line A—A of FIG. 6, and FIG. 8 is a sectional view taken along line B—B of FIG. 6. Transparent surface substrate 1 such as a glass substrate is formed with a plurality of strip-shaped display electrodes 4 each formed of a pair of scan electrode 2 and sustain electrode 3, and light-shielding layer 5 is formed between adjacent display electrodes 4 on surface substrate 1. Scan electrode 2 and sustain electrode 3 are formed of respective transparent electrodes 2a, 3a and respective buses 2b, 3b, made of silver or the like, and which are electrically connected to respective transparent electrodes 2a, 3a. Dielectric layer 6 is formed above surface substrate 1 to cover display electrodes 4 and is covered with MgO film 7 functioning as a protective film as well as a secondary-electron-emitting film. Front panel 20 is thus formed of these elements.

Back substrate 8 disposed to face surface substrate 1 is formed with a plurality of stripe-shaped data electrodes 10 in a direction orthogonal to display electrodes 4 each formed of scan and sustain electrodes 2, 3. These data electrodes 10 are covered with dielectric layer 9. A plurality of stripe-shaped barrier ribs 11 is arranged parallel to data electrodes 10 on dielectric layer 9, and each barrier rib 11 is located between data electrodes 10. Phosphor layer 12 is provided between adjacent barrier ribs 11, covering a side of each barrier rib 11 and dielectric layer 9. Back panel 30 is thus formed of these elements.

Front and back panels 20, 30 are opposed to each other across a minute discharge space with scan and sustain electrodes 2, 3 orthogonal to data electrodes 10, and their periphery is sealed. The discharge space is filled with a discharge gas such as helium, neon, argon, xenon or a gas mixture. Barrier ribs 11 partition the discharge space into a plurality of sections, so that discharge cells 13 are formed at intersections of display electrodes 4 and data electrodes 10.

A write discharge is first caused between display electrode 4 and data electrode 10 in discharge cell 13 selected from the plurality of discharge cells 13 by data electrode 10. Thereafter, a main discharge is caused between scan electrode 2 and sustain electrode 3, whereby vacuum ultraviolet rays are generated. The vacuum ultraviolet rays strike phosphor layer 12, thereby being converted into visible light. In this way, the plasma display panel performs display.

Phosphor layers 12 having respective colors of red (R), green (G) and blue (B) are successively deposited in adjacent discharge cells 13, respectively. Light-shielding layer 5 covers between discharge cells 13 to shield the light coming from adjacent discharge cell 13.

To meet a demand for higher image quality, the plasma display panel has increasingly high definition. In the high-definition plasma display panel, the number of pixels or discharge cells 13 increases per unit area of a display screen. With the size of the screen remaining the same, the area of each pixel or discharge cell 13 reduces, so that the surface area of the phosphor layer exposed to the vacuum ultraviolet rays reduces. Consequently, the panel has reduced luminance.

As examples for improving the luminance of the panel, an example of providing a projection shorter than the barrier rib in the discharge cell and coating this projection with a phosphor for increased surface area of the phosphor layer, and an example of providing a recessed and projected part at the barrier rib or the dielectric layer that is to be coated with the phosphor for increased surface area of the phosphor layer are disclosed in Japanese Patent Unexamined Publication Nos. 2000-77002, 2001-273854 and 2002-8544.

However, the above-described example of providing the projection shorter than the barrier rib in the discharge cell or providing the recessed and projected part at the surface of the barrier rib or the dielectric layer requires a complicated process of forming the projection or the recessed and projected part particularly in the extremely minute discharge cell. Moreover, the projection or the recessed and projected part reduces the volume of the discharge space, thus adversely affecting the discharge.

In view of the problems described above, the present invention aims to realize a plasma display panel with improved luminance and a method of manufacturing this plasma display panel. The present invention can increase the surface area of a phosphor layer without reducing the volume of a discharge cell of even the high-definition plasma display panel.

SUMMARY OF THE INVENTION

A plasma display panel of the present invention includes, above one of a pair of substrates facing each other across a discharge space,:

an electrode;

a dielectric layer covering the electrode;

a barrier rib provided on the dielectric layer, the barrier rib being parallel to the electrode; and a phosphor layer provided to cover a side of the barrier rib and the dielectric layer between the barrier ribs, the phosphor layer including, at least at a surface thereof exposed to the discharge space, a recessed and projected part having one of width and depth that is more than a maximum particle diameter of a phosphor forming the phosphor layer.

This structure can provide increased surface area of the phosphor layer while securing the volume of the discharge space. Since the effective surface area of the phosphor layer can be increased, use efficiency and luminous efficacy of the phosphor layer can be improved, and even the high-definition panel can have high luminance.

The recessed and projected part has one of width and depth that ranges from 5 μm to 10 μm, thus being optimum for increasing the surface area of phosphor particles used. The panel thus has high luminance.

DETAILED DESCRIPTION OF THE PREFERRED EMBODIMENTS

Exemplary embodiments of the present invention are demonstrated hereinafter with reference to the accompanying drawings.

(First Embodiment)

Figure 1:
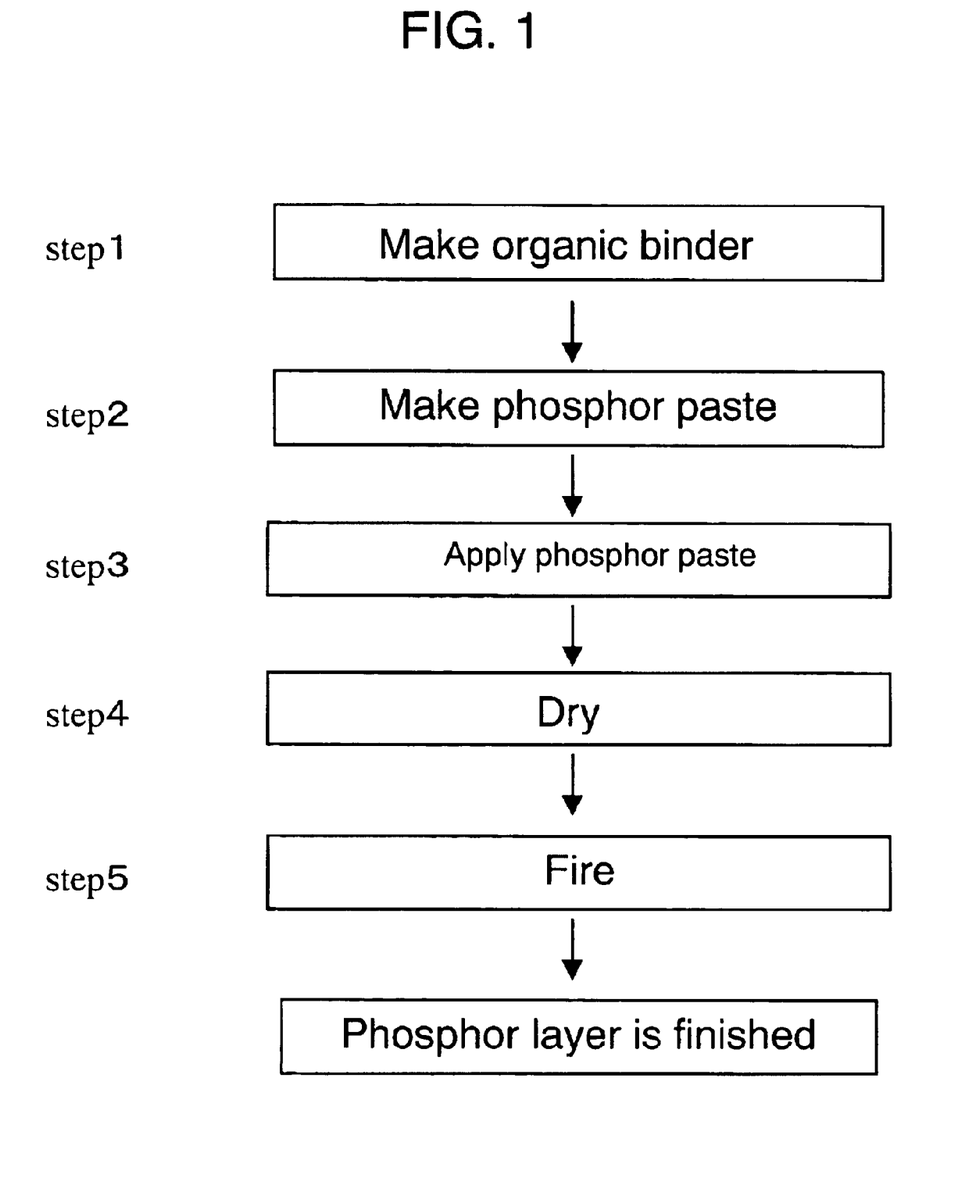
FIG. 1 is a flow chart for formation of a phosphor layer of a back panel of a plasma display panel in accordance with a first exemplary embodiment of the present invention.
Figure 2:
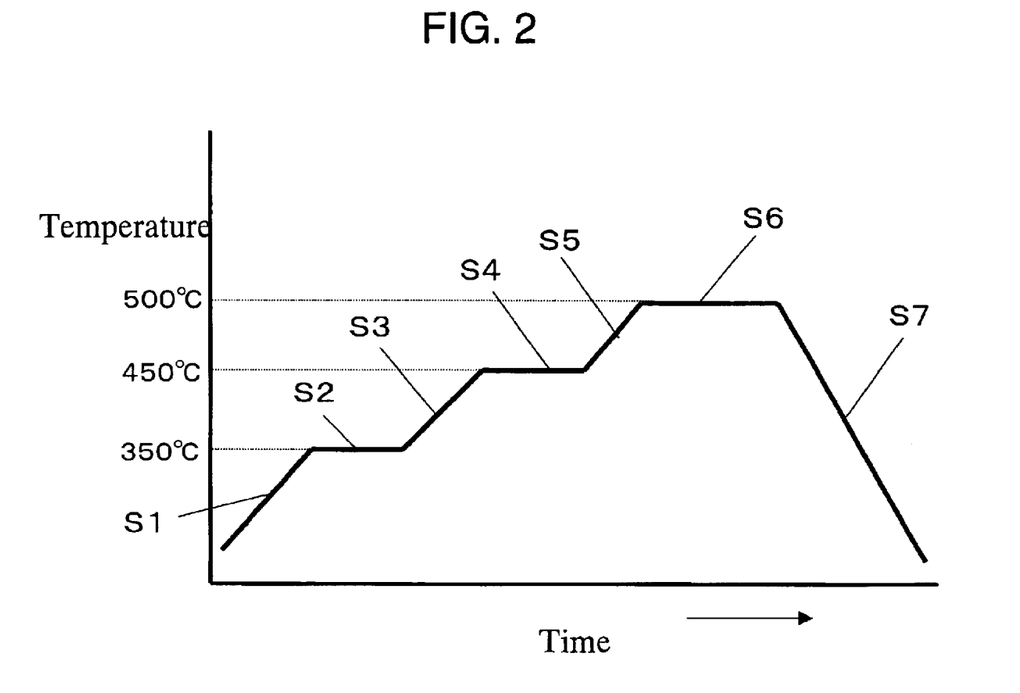
FIG. 2 shows a temperature profile in a step of firing the back panel in accordance with the first embodiment of this invention.
Figure 3A:
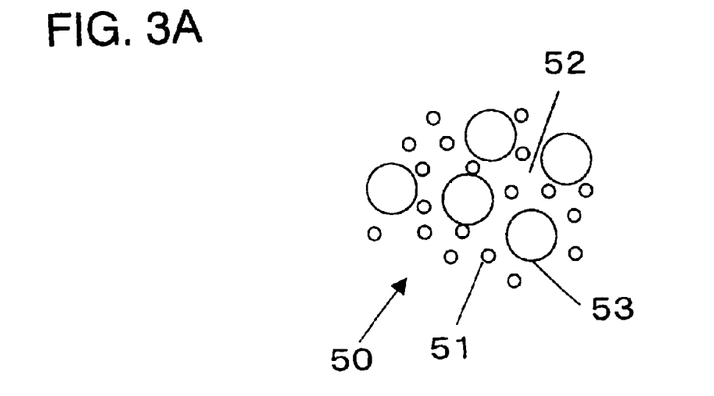
FIG. 3 schematically illustrates the structure of phosphor paste in accordance with the first embodiment of this invention.
Figure 3B:
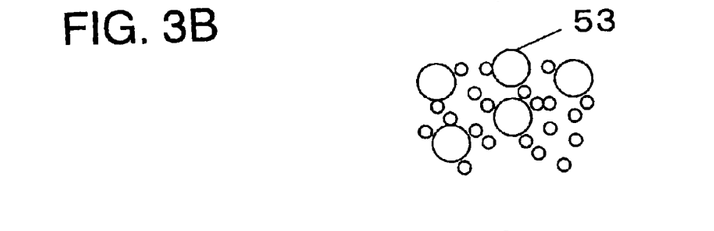
Figure 3C:
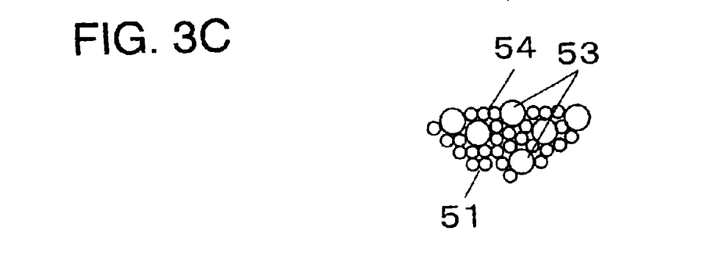
Figure 3D:
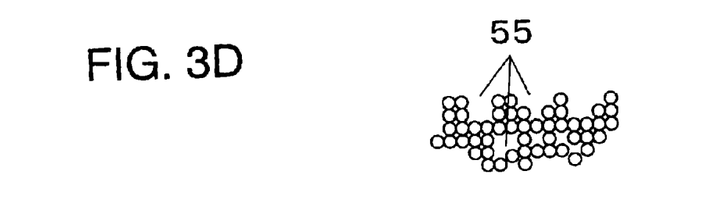

FIG. 1 is a flow chart for formation of a phosphor layer of a back panel of a plasma display panel in accordance with a first exemplary embodiment of this invention. FIG. 2 shows a temperature profile in a step of firing the back panel, and FIG. 3 schematically illustrates the structure of phosphor paste.

The plasma display panel of the present invention is similar in overall structure to a typical surface discharge AC type plasma display panel illustrated by FIG. 6 except that the phosphor layer of its back panel has a different shape. Accordingly, elements similar to those in FIG. 6 have the same reference marks.

Referring to FIG. 1, a description will be provided hereinafter of a process for forming the phosphor layer of the back panel in accordance with the present embodiment of this invention. In step 1, an organic binder is prepared. The organic binder is made by dissolving resin, which is ethyl cellulose, and solvent including α-terpineol (α-TPO) and butyl carbitol (BCA) through heating. The organic binder uses ethyl cellulose for the purpose of improving dispersibility of phosphor particles throughout the solvent in a subsequent step of making the phosphor paste. In the present invention, the resin (ethyl cellulose) used includes a plurality of resins of different ethoxyl contents. The resin with a low ethoxyl content is water-soluble and thus gels without dissolving in the polar solvent such as α-terpineol or butyl carbitol acetate. The organic binder made in step 1 thus includes gelled resin particles ranging from several tens to several hundreds of micrometers in size. In this embodiment, the organic binder was made by dissolving 18% of ethyl cellulose with an ethoxyl content of 48.0 to 49.5%, 2% of ethyl cellulose with an ethoxyl content of 45.0 to 47.0%, 60% of α-terpineol and 20% of butyl carbitol acetate through heating. It is confirmed experimentally that most of ethyl cellulose with a 48.0 to 49.5% ethoxyl content dissolves in the polar solvent, while ethyl cellulose with a 45.0 to 47.0% ethoxyl content does not dissolve, but easily gels.

It is to be noted that the binder may use a polymer such as PMA, and an organic solvent such as diethylene glycol or methyl ether.

In step 2, the phosphor paste is made by mixing the above-mentioned organic binder with each of the red, blue and green phosphor particles. The red phosphor used here is a compound expressed by $(Y,Gd)_{1-x}BO_3:Eu_x$ or $Y_{2-x}O_3:Eu_x$, the green phosphor used here is a compound expressed by $Ba_{1-x}Al_{12}O_{19}:Mn_x$ or $Zn_{2-x}SiO_4:Mn_x$, and the blue phosphor used here is a compound expressed by $Ba_{1-x}MgAl_{10}O_{17}:Eu_x$ or $Ba_{1-x-y}Sr_yMgAl_{10}O_{17}:Eu_x$. Particle diameters vary from phosphor to phosphor, but these phosphors have a mean particle diameter of about 2 μm to 3 μm, a minimum particle diameter of about 0.1 μm and a maximum particle diameter of about 5 μm. Each of the red, blue and green phosphor particles and the organic binder are mixed to form the 1,500- to 30,000-centipoise (CP) phosphor paste. On an as needed basis, a surface active agent, silica, a dispersant (in an amount of 0.1 to 5 wt %) or the like may be added. Here, the phosphor paste is made by mixing 40 to 80% of the organic binder prepared in step 1 and 20 to 60% of each of the red, blue and green phosphor particles with a three-roll mill or the like.

In step 3, the phosphor paste made in step 2 is applied between barrier ribs 11 formed above substrate 8 of back panel 30 of the plasma display panel, thus forming a phosphor film, which becomes phosphor layer 12. The phosphor film can be formed by various methods including an ink-jet method, according to which the phosphor paste is applied by being discharged from a nozzle, photolighography and screen printing.

In step 4, the phosphor film obtained in step 3 is dried for removal of the organic solvent. The organic solvent is removed by a heating furnace controlled to 100 to 150° C. over a specified period of time during which the gelled resin particles, which are formed by the resin with the low ethoxyl content, dry and condense, thus changing from the size ranging from several tens to several hundreds of micrometers to a reduced size. The gelled resins easily accumulate at a surface of the phosphor film while the organic solvent vaporizes.

In step 5, which is a final step for forming the phosphor layer, the phosphor film is fired for removal of the organic binder, whereby phosphor layer 12 is completed. Firing is done with a continuous firing furnace while its temperature profile is varied. FIG. 2 shows the temperature profile in the firing step of the present embodiment. As shown in FIG. 2, the temperature profile includes profiles S1–S7.

In stage S1 where the temperature is being raised, the remainder of the organic solvent removed in drying step 4 is removed. In stage S2 where the temperature is maintained, the resin with the high ethoxyl content in the organic binder is burnt out, and the gelled resins are reduced to sizes ranging from several micrometers to several tens of micrometers.

In stage S4 where the temperature is maintained, the resin with the low ethoxyl content in the organic binder is burn out, whereby the gelled resins, which have ranged from several micrometers to several tens of micrometers in size in the prior heat-treating stage, are burnt out. In stage S6 where the temperature is maintained, remaining impurities and others are burnt out, whereby the phosphor layer is completed. In the present embodiment, two stages S2, S4 are provided for removal of the binder. However, the binder can be removed in one stage by adjusting a period of time during which the temperature is maintained. In each of stages S3 and S5, the temperature is raised for the next stage, and the temperature is lowered in stage S7.

FIG. 3 schematically illustrates structural changes of the phosphor paste applied between barrier ribs that are effected by these steps. Right after formation of phosphor film 50 by application of the phosphor paste between barrier ribs 11, as shown in FIG. 3(a), phosphor particles 51 having a particle size distribution of 0.1 to 5 μm and a mean particle diameter of about 2 μm are caught in organic binder 52 made of the resin and the organic solvent, and gelled substances 53 formed by the resin with the low ethoxyl content are scattered. Here, gelled substances 53 range from several tens to several hundreds of micrometers in size.

In phosphor film 50 which has undergone the drying step and stage S1 of the firing step, the organic solvent is vaporized, and gelled substances 53 are condensed and reduced in size.

In phosphor film 50 which has undergone stage S2 of the firing step for removal of the resin with the high ethoxyl content, the organic binder between phosphor particles 51 is burn out, whereby phosphor particles 51 are closely packed, and gelled substances 53 reduced to sizes ranging from several micrometers to several tens of micrometers are dispersed throughout surface 54. In this case, not all gelled substances 53 are present at surface 54, and some gelled substances 53 are present in phosphor film 50.

Phosphor film 50 which has undergone stages S4 and S6 of the firing step is formed with spaces 55 in areas where gelled substances 53 are burnt out. Surface 54 of phosphor film 50 thus has a recessed and projected part having more width or depth than the maximum particle diameter of phosphor particles 51, and consequently, the phosphor layer can have increased effective surface area.

Even in a conventional method of forming a phosphor layer, a phosphor film has some roughness at its surface, but this roughness is dependent on the particle diameter of a phosphor, so that increasing the surface area effectively is difficult. The trend has been to reduce the effective surface area because the particle diameter of the phosphor has reduced recently for improvement in characteristics of the phosphor, causing surface 54 to have reduced roughness. The present invention, however, can control the roughness irrespective of phosphor particle diameter and change the surface area by controlling the ethoxyl content, molecular weight of the resin and the relative proportion of the resins in making the organic binder.

(Second Embodiment)

In many cases, a plasma display panel is designed to balance red, green and blue by controlling the respective surface areas of red, green and blue phosphor layers 12 successively deposited in respective adjacent discharge cells 13. For example, an interval between barrier ribs 11 is changed to increase the area of the blue discharge cell or the surface area of the blue phosphor layer, or green emission which provides high visibility is suppressed by means of the number of pulses applied to display electrode 4 shown in FIG. 6. According to the present invention, the surface area of each of red, green and blue phosphor layers 12 is controlled by controlling, for each color, the particle diameter, shape and proportion of an organic material mixed into each of red, green and blue phosphor pastes, so that white having a high color temperature can be realized with high luminance and with high definition.

Figure 4A:
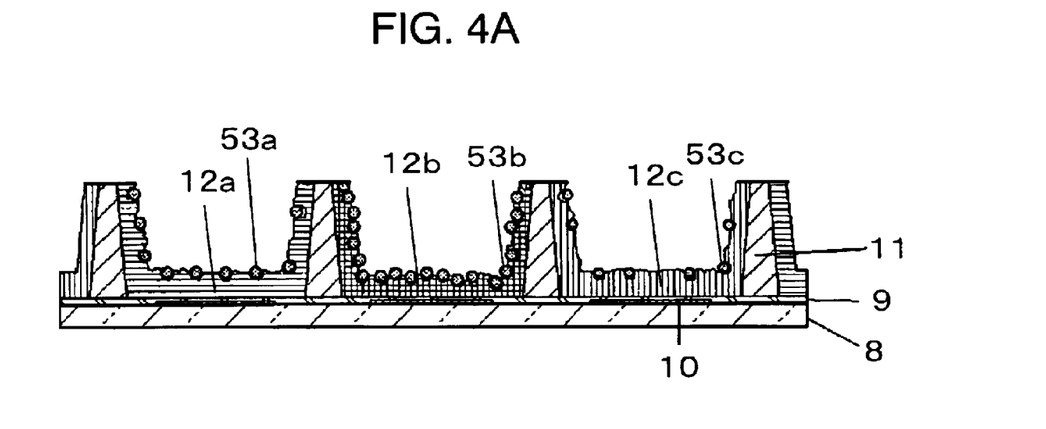
FIG. 4 shows sectional views of the back panel, illustrating phosphor layers having respective colors and different surface areas in accordance with a second exemplary embodiment of this invention.
Figure 4B:
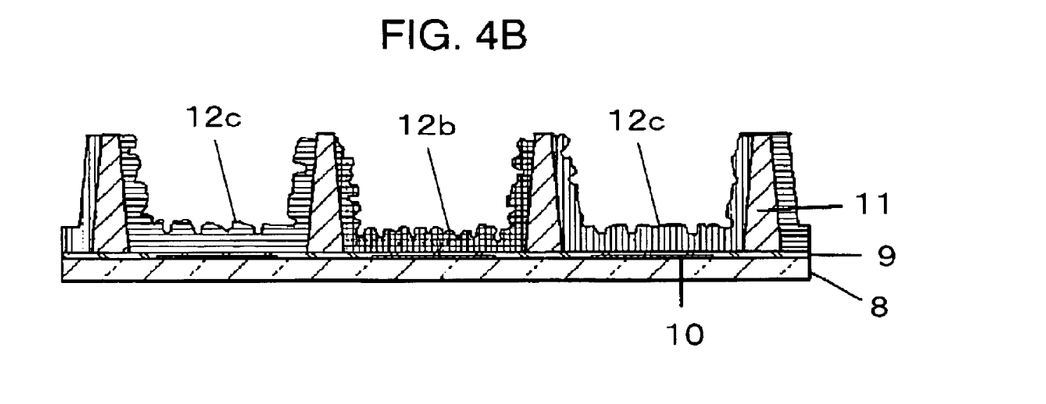

FIG. 4 shows sectional views of a back panel, illustrating the phosphor layers having respective colors and different surface areas in accordance with a second exemplary embodiment. FIG. 4(a) illustrates a state subsequent to stage S2 of a firing step illustrated by FIG. 2, and FIG. 4(b) illustrates a state obtained upon termination of the firing step. In the present embodiment, the numbers of gelled substances 53a, 53b, 53c at respective surfaces of red, blue and green phosphor layers 12a, 12b, 12c are controlled individually as shown in FIG. 4(a). In other words, an adjustment is made to an organic binder so that gelled substances 53b of blue phosphor layer 12b increase in number compared with gelled substances 53a of red phosphor layer 12a and gelled substances 53c of green phosphor layer 12c. As a result of the firing step, the surface area of blue phosphor layer 12b can be increased compared with those of red and green phosphor layers 12a, 12c, as shown in FIG. 4(b). This not only allows barrier ribs to be formed at equal intervals, thereby improving a manufacturing yield of back panel 30 but also realizes a plasma display panel that provides extremely high visibility and has high luminance. It goes without saying that the surface area of each of the phosphor layers having respective colors can be controlled by changing the size of the gelled substance for each color instead of changing the number of gelled substances.

In the present invention, a recessed and projected part, formed as a result of the gelled substances being burnt out, has 5- to 10-μm width or depth which is more than the maximum particle diameter of the phosphors used, whereby the surface area can be increased effectively. For example, with the red, green and blue discharge cells having the same area, the present embodiment can increase the surface areas of the red, green and blue phosphor layers by 1.1 times, 1.05 times and 1.2 times, respectively, and improve luminance by 1.1 times.

(Third Embodiment)

In the first and second embodiments, one type of phosphor paste that is made by mixing a plurality of resins of different ethoxyl contents is used to form phosphor layers of respective colors. To ensure increased surface area of each phosphor layer and to prevent formation of spaces in the phosphor layer, forming each phosphor layer into a multilayer structure is effective.

Figure 5:
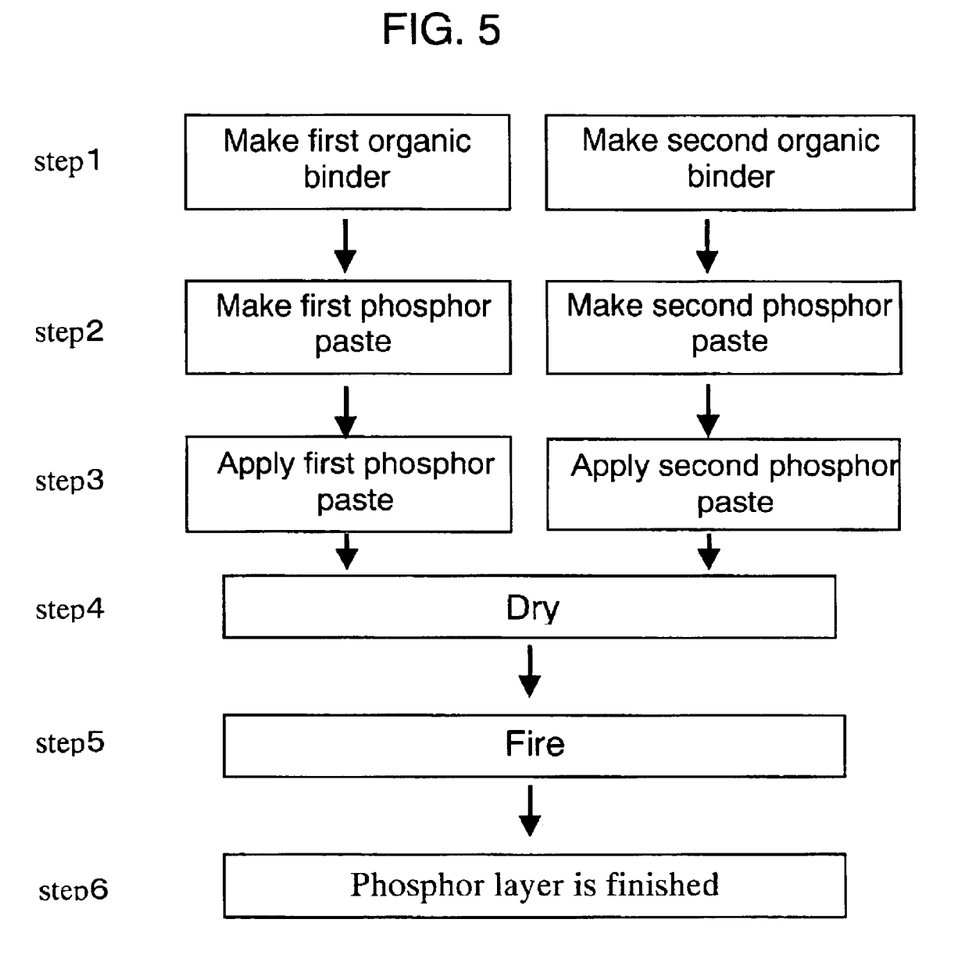
FIG. 5 is a flow chart for formation of a phosphor layer of a back panel of a plasma display panel in accordance with a third exemplary embodiment of this invention.

In other words, phosphor paste which causes hard formation of gelled substances can be used for a lower part of the phosphor layer, and phosphor paste which causes easy formation of the gelled substances can be used for an upper part of the phosphor layer. FIG. 5 is a flow chart for formation of the phosphor layer of a back panel of a plasma display panel in accordance with a third exemplary embodiment of the present invention.

As shown in FIG. 5, steps 1–3 of the third embodiment are each divided into two. Specifically, step 1 includes a step of preparing a first organic binder and a step of preparing a second organic binder, step 2 includes a step of making a first phosphor paste and a step of making a second phosphor paste, and step 3 includes a step of applying the first phosphor paste and a step of applying the second phosphor paste. The upper and lower parts are separately formed by application so that the phosphor paste using the first organic binder forms the lower part of the phosphor layer, while the phosphor paste using the second organic binder forms the upper part or the surface of the phosphor layer. The first organic binder uses ethyl cellulose with a high ethoxyl content for forming the paste causing no formation of the gelled substances, so that phosphor layer formed has increased packing density of phosphor particles. The second organic binder uses ethyl cellulose with a low ethoxyl content to cause easy formation of the gelled substances, whereby a recessed and projected part is formed at the surface of the phosphor layer. Consequently, the surface area can be increased.

In the present embodiment, the first organic binder is made by dissolving 20% of ethyl cellulose with an ethoxyl content of 48.0 to 49.5%, 60% of α-terpineol and 20% of butyl carbitol acetate through heating, and the second organic binder is made by dissolving a resin mixture of 12% of ethyl cellulose with an ethoxyl content of 48.0 to 49.5% and 8% of ethyl cellulose with an ethoxyl content of 45.0 to 47.0%, 60% of α-terpineol and 20% of butyl carbitol acetate through heating. The phosphors and steps 3–5 are similar to those mentioned in the first and second embodiments.

The third embodiment can increase the phosphor packing density at the lower part of the phosphor layer, thereby increasing reflection of ultraviolet rays at the lower part. This embodiment can also increase the area of the surface, thereby improving luminance of the panel. The phosphor layer can be formed to have more than two layers, and the surfaces can be varied from color to color.

As described above, the embodiments of the present invention can provide the plasma display panel having excellent luminance and the manufacturing method for this plasma display panel. These embodiments can increase the surface area of the phosphor layer in a simple and easy way, eliminating the need to provide a projection shorter than the barrier rib in the discharge cell or a recessed and projected part at the barrier rib or the dielectric layer that is to be coated with the phosphor.

What is claimed is:

1. A plasma display panel comprising, above one of a pair of substrates facing each other across a discharge space:
   an electrode;
   a dielectric layer covering the electrode;
   a barrier rib provided on the dielectric layer, the barrier rib being parallel to the electrode; and
   a phosphor layer provided to cover a side of the barrier rib and the dielectric layer between the barrier ribs, the phosphor layer including, at least at a surface thereof exposed to the discharge space, a recessed and projected part having one of width and depth that is more than a maximum particle diameter of a phosphor forming the phosphor layer.

2. The plasma display panel of claim 1, wherein the recessed and projected part has one of the width and depth that ranges from 5 $\mu$m to 10 $\mu$m.

3. The plasma display panel of claim 1, wherein the phosphor layer includes red, blue and green phosphor layers, and the recessed and projected parts of the phosphor layers have respective shapes varying from color to color.

* * * * *